US007073857B1

(12) United States Patent
Bailey

(10) Patent No.: US 7,073,857 B1
(45) Date of Patent: Jul. 11, 2006

(54) TRAILER HITCH CHAIR HANGER

(76) Inventor: Braydon R. Bailey, 1392 W. 2275 South, Syracuse, UT (US) 84075

( * ) Notice: Subject to any disclaimer, the term of this patent is extended or adjusted under 35 U.S.C. 154(b) by 0 days.

(21) Appl. No.: 11/201,514

(22) Filed: Aug. 10, 2005

(51) Int. Cl.
 *A47C 31/00* (2006.01)
(52) U.S. Cl. .................. 297/217.7; 297/273; 297/277; 297/280; 224/547
(58) Field of Classification Search ................ 297/273, 297/277, 280; 224/547, 521, 519
See application file for complete search history.

(56) References Cited

U.S. PATENT DOCUMENTS

| D230,109 S | 1/1974 | Gass |
| D249,408 S | 9/1978 | Jackson |
| 4,856,686 A * | 8/1989 | Workentine ................. 224/497 |
| 5,244,392 A | 9/1993 | Maursetter |
| 5,454,496 A * | 10/1995 | Sumida et al. .............. 224/509 |
| 5,458,389 A * | 10/1995 | Young ..................... 296/26.08 |
| 5,857,741 A | 1/1999 | Anderson |
| 6,152,675 A | 11/2000 | Compton |
| 6,250,483 B1 | 6/2001 | Frommer |
| 6,314,891 B1 | 11/2001 | Larson |
| 6,623,025 B1 * | 9/2003 | McCoy et al. .............. 280/504 |
| 6,662,983 B1 * | 12/2003 | Lane et al. ................. 224/405 |
| 6,705,821 B1 | 3/2004 | Philipps et al. |
| 6,739,643 B1 | 5/2004 | Rock et al. |
| 6,775,860 B1 | 8/2004 | Unruh |
| 6,808,231 B1 | 10/2004 | Hill |
| 6,921,007 B1 * | 7/2005 | Guerrant ..................... 224/519 |

OTHER PUBLICATIONS

BailCorp International Products; Hammaka Hammocks product brochure, 4 pgs., Kaysville, Utah.

* cited by examiner

*Primary Examiner*—Laurie K. Cranmer
(74) *Attorney, Agent, or Firm*—Thorpe North & Western

(57) ABSTRACT

Apparatus to provide an overhead support for suspending hanging furniture includes a base configured for attachment to a vehicle trailer hitch receiver. An upright member extends upwardly from the base and at least one support member extends outwardly from the upright member a sufficient distance to receive and suspend a hanging chair. Preferably, two support members are provided and extend outwardly from the upright member in different directions from one another so that two hanging chairs can be supported in normal hanging condition spaced from one another and from the upright member. The support members are preferably removably mounted to the upright so that the apparatus can be disassembled for easy transportation and storage. At least one of the support members is preferably rotatably mounted to the upright member so its orientation can be rotatably adjusted in relation to the upright member.

20 Claims, 4 Drawing Sheets

Figure 1:
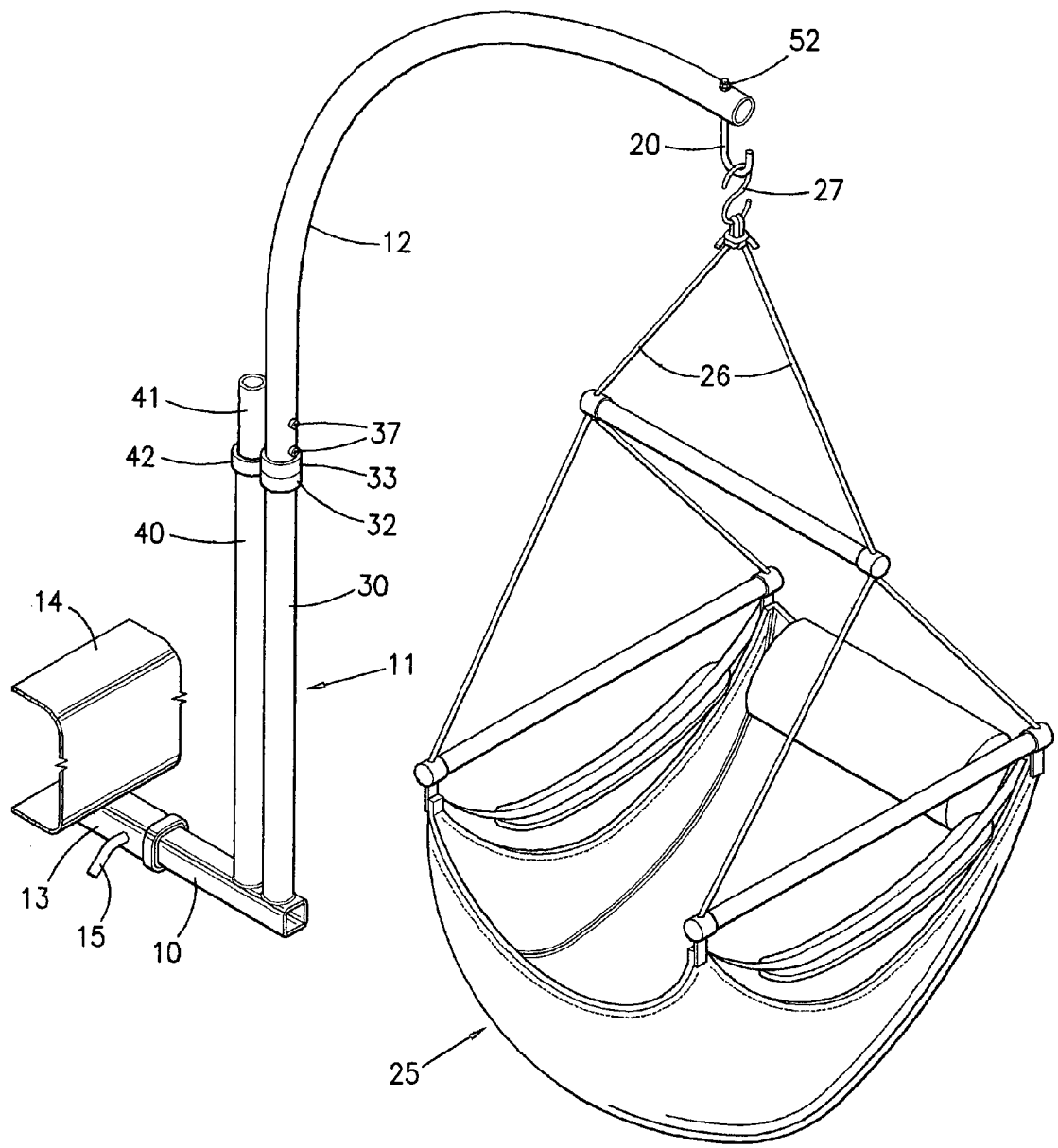

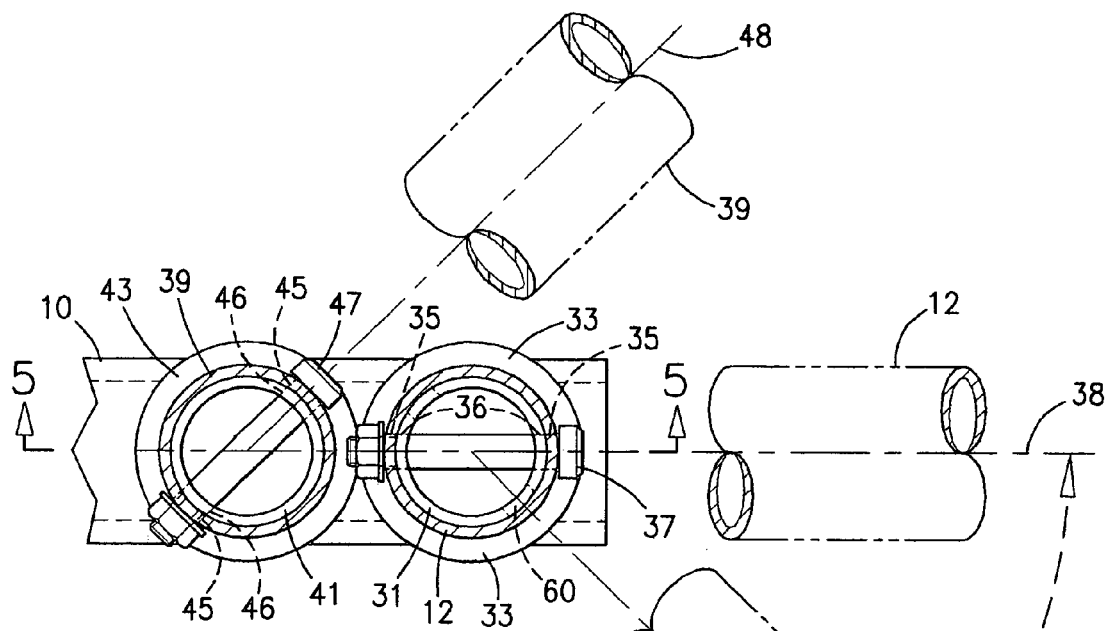
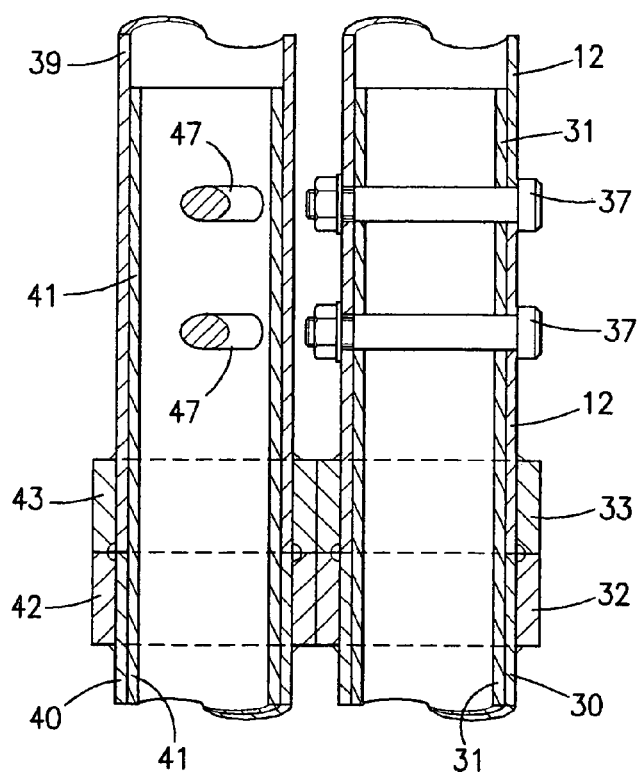
FIG. 4
FIG. 5

TRAILER HITCH CHAIR HANGER

BACKGROUND OF THE INVENTION

1. Field

The invention is in the field of stands or hangers for chairs, particularly hammock type chairs, which are suspended or hung from a hook above the chair.

2. State of the Art

Chairs are currently available, generally referred to as hammock chairs, which are hanging chairs suspended by ropes from an overhead hook. A common embodiment of hammock chairs have a cross bar, two side bars, and a sling of canvas or similar material in which the user sits. The cross bar, which has ropes extending from its ends to the hook, spreads the sling to create the width for the chair, and the side bars, which have ropes at their ends extending to the cross bar, create a front to back depth for the sling and chair. When used under a roof, the hook is installed in the roof to suspend the chair. When outside, the chair can be suspended or hung from a tree branch from either a hook attached to the tree branch or by tying the ropes from the chair around the tree branch. When hung from a hook, the chair is free to swing to some extent. Because these chairs have to be suspended from a hook or other support above the chair, use of such chairs has been limited to locations under a roof or tree where the overhead support is available.

To increase the places where such chairs can be used, C-stands have been developed to support such chairs. A C-stand has an arm that extends in a "C" shape from a base with supporting legs extending therefrom which rest on a supporting surface, such as a floor or the ground, to an upper end with a hook, usually about eight feet above the supporting surface. The upper end receives the ropes from the chair and suspends the chair above the base. Since the chair can swing, each supporting leg has to extend outwardly from the base about three feet to prevent tipping of the base. This means that the base for the C-stand extends about six feet by six feet. The weight of a C-stand is about seventy pounds. Thus, a C-stand is large and heavy, making it inconvenient to take places such as camping, picnicing, or tailgating.

U.S. Pat. Nos. 5,857,741, 6,314,891, and 6,739,643 show various arrangements of chairs and tables supported by trailer hitch receivers at the back of a vehicle. The chairs and tables are all supported in fixed position from beneath by the bar extending from the trailer hitch receiver.

U.S. Pat. Nos. 6,152,675, 6,250,483, and 6,705,821 show hoists or game hangers which are supported by trailer hitch receivers at the back of a vehicle. These hoists provide hooks for lifting and hanging large game, such as deer, behind trucks for cleaning and butchering. U.S. Pat. No. 6,250,483 even provides an elevated chair mounted on the hoist, but again, mounted from the bottom so the chair is supported in fixed position from underneath.

SUMMARY OF THE INVENTION

Hanging chairs provide a unique relaxing position for sitting. However, an overhead support for hanging the chair is needed. This makes it difficult to enjoy such chairs while camping, picnicing, or tailgating. In many instances a vehicle is positioned or may easily be positioned at a camp or picnic site, and a vehicle is generally available at tailgating sites. Often, these vehicles have trailer hitches which use a trailer hitch receiver mounted to the vehicle. According to the invention, chair hanging apparatus is provided that attaches to a trailer hitch receiver of a vehicle so that a hanging chair, and preferably two hanging chairs, may easily be hung from the back of the vehicle. This allows easy hanging of a chair anywhere a vehicle can be parked.

The apparatus of the invention includes a base configured for attachment to a vehicle trailer hitch receiver. An upright member extends upwardly from the base and at least one support member extends outwardly from the upright member a sufficient distance to receive and suspend a hanging chair or other item of hanging furniture in normal hanging condition spaced from the upright member and the vehicle. Preferably, two support members are provided and extend outwardly from the upright member in different directions from one another so that two hanging chairs or other items of hanging furniture can be supported in normal hanging condition spaced from one another and from the upright member. The support members are preferably removably mounted to the upright so that the apparatus can be disassembled for easy transportation and storage. If two support members can be used, at least one of the support members is preferably rotatably mounted to the upright member so that the support member can be positioned to extend directly behind the vehicle if only one chair is being used, or can be positioned to extend at an angle behind the vehicle and at an angle to the second support member, if the second support member is used, to provide adequate separation between the two hanging chairs so that both chairs can be used without hitting or interfering with one another.

THE DRAWINGS

Figure 2:
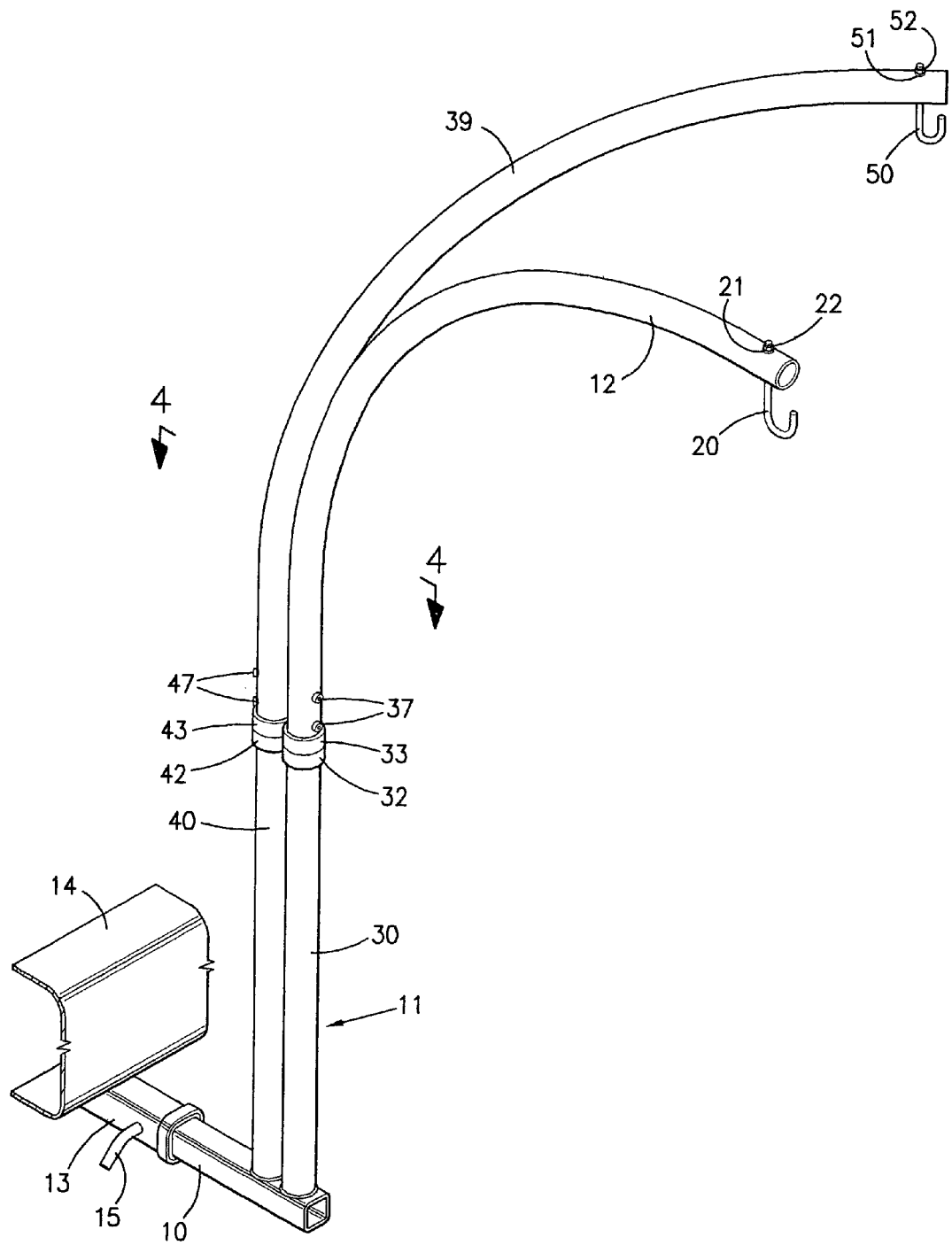
Figure 3:
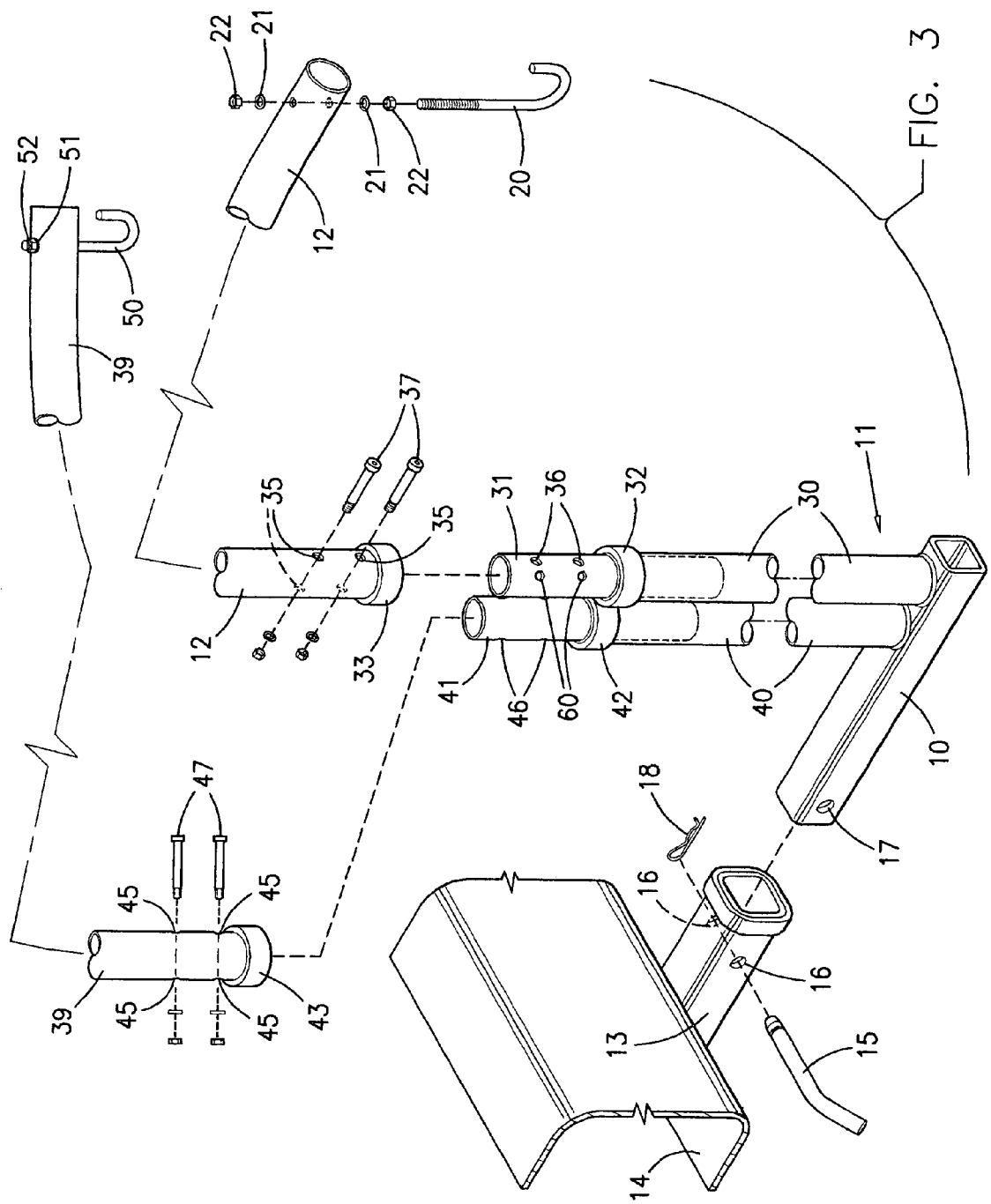

In the accompanying drawings, which show the best mode currently contemplated for carrying out the invention:

FIG. 1 is pictorial view of the apparatus of the invention installed in a trailer hitch receiver, the vehicle is not shown, with a single support member and with a single hanging chair suspended from the support member;

FIG. 2, a similar view of the apparatus as in FIG. 1, but without the hanging chair installed, and with two support members;

FIG. 3, a fragmentary assembly view of the apparatus as shown in FIG. 2;

FIG. 4, transverse section taken on the line 4—4 of FIG. 2 and showing alternate rotated positions of one of the support members; and FIG. 5, a vertical section taken on the line 5—5 of FIG. 4.

DETAILED DESCRIPTION OF THE ILLUSTRATED EMBODIMENT

The apparatus of the invention includes a base 10, an upright member 11, and at least one support member 12, FIG. 1. The base 10 is configured to attach to a trailer hitch receiver 13 mounted on a vehicle, not shown, below vehicle rear bumper 14. Such attachment may be made by inserting one end of base 10 into the trailer hitch receiver 13. A pin 15 extends through aligned receiving holes 16, FIG. 3, in the receiver 13 and 17 in base 10 in normal manner when base 10 is inserted into receiver 13 to lock base 10 in receiver 13. Pin 15 is locked in position by clip 18. A hook 20 is secured to the outward or support end of support member 12 by washers 21 and nuts 22, FIG. 3. A hanging chair 25, FIG. 1, shown as a chair normally referred to as a hammock chair, is suspended by ropes 26 tied to S hook 27, which is hung on support hook 20. The height of chair 25 above the ground is adjusted by changing where along their lengths the ropes 26 are tied to S hook 27. Tying ropes 26 to S hook 27 and using S hook 27 to hang the chair is the usual manner of hanging such hammock chairs. While the hook 20 is shown secured to support member 12 by washers 21 and nuts 22, hook 20 could be secured to support member 12 in any suitable manner, such as by welding. Further, various other types of hooks or rings can be used or a hole could be provided in the support member for receiving the end of the S hook or other type of hook from the chair. In addition, the ropes from the chair can be tied to various types of hooks or rings other than an S hook, or alternately can be tied or otherwise connected directly to hook 20 or other hooks secured to support member 12 or directly to support member 12.

While upright member 11 and support member 12 could be made as a single piece extending from base 10, it is currently preferred that support member 12 be separable from upright member 11 and be removably mounted thereto so that support member 12 can be removed from upright member 11 when not in use to ease transportation and storage of the apparatus. In the embodiment shown, upright member 11 includes a tubular member 30 with insert 31, FIGS. 3 and 5, extending from its upper end. The lower end of tubular member 30 is secured, such as by welding, to base 10. Insert 31 is secured in the upper end of tubular member 30 in any suitable manner, such as by welding. A reinforcing collar 32 is secured around the outside of the upper end of tubular member 30, again, in any suitable manner, such as by welding. The inward end of support member 12, sometimes referred to as the attachment end, forms a sleeve to freely fit over the portion of insert 31 that extends from the upper end of upright tubular member 30 to rotatably mount support member 12 to upright 11. Reinforcing collar 33 is secured around the outside of the inward end of support member 12. Reinforcing collars 32 and 33 abut, as do the upper end of tubular member 30 and inward end of support member 12, when support member 12 is mounted to upright 11. It is preferred that once support member 12 is mounted to upright 11, that it be secured thereto rather than be free to rotate. For this purpose, aligned holes 35 are provided through support member 12 to mate with aligned holes extending through insert 31. Thus, when support member 12 is mounted to upright 11 by fitting the inward end of support member 12 over insert 31, and is rotated so that holes 35 through support member 12 are aligned with holes 36 through insert 31, pins, here in the form of bolts 37, can be inserted through the aligned holes to secure support member 12 to upright 11. In the embodiment shown, when holes 35 and 36 are aligned, support member 12 extends straight back in a plane extending along axis 38, FIG. 4, from the vehicle and in line with base 10 extending from trailer hitch receiver 13. Base 10 is elongate and axis 38 shown in FIG. 4 coincides with the longitudinal axis of base 10.

While the apparatus can be configured with a single support member to support a single hanging chair or other item of hanging furniture, the illustrated embodiment can support two hanging chairs side-by-side. Thus, the top end of upright 11 is adapted to receive and mount two separate support members shown in FIGS. 2–5 as support member 12 and support member 39. As shown, upright member 11 includes a second tubular member 40 with insert 41, FIGS. 3 and 5, extending from its upper end. Insert 41 is secured in the upper end of tubular member 40 in any suitable manner, such as by welding. A reinforcing collar 42 is secured around the outside of the upper end of tubular member 40, again, in any suitable manner, such as by welding. The innward end of support member 39 freely fits over the portion of insert 41 that extends from the upper end of upright tubular member 40 to rotatably mount support member 39 to upright member 11. Reinforcing collar 43 is secured around the outside of the inner end of support member 39. Reinforcing collars 42 and 43 abut, as do the upper end of tubular member 40 and inward end of support member 39, when support member 39 is mounted to upright 11. As with support member 12, it is preferred that once support member 39 is mounted to upright 11, that it be secured thereto rather than be free to rotate. For this purpose, aligned holes 45 are provided through support member 39 to mate with aligned holes 46 extending through insert 41. Thus, when support member 39 is mounted to upright 11 by fitting over insert 41, and is rotated so that holes 45 are aligned with holes 46 through insert 41, bolts 47 can be inserted through the aligned holes to secure support member 39 to upright 11. In the embodiment shown, when holes 45 and 46 are aligned, support member 39 extends back from the vehicle in a plane extending along axis 48, FIG. 4, in a forty five degree angle from axis 38 extending straight back from base 10. This is also forty five degrees from a line extending along the back bumper 14. Similarly to hook 20, a hook 50 to suspend a hanging chair or other item of hanging furniture is secured to the outward end of support member 39 by washers 51 and nuts 52.

In order to provide each of two hanging chairs with adequate separation so that both chairs can be used without hitting or interfering with one another, it is preferred that each support member be angled at forty five degrees from axis 38. In such instance, the supports 12 and 39 will have an angle of ninety degrees between them. For this purpose, insert 31 has a second set of aligned holes 60, FIGS. 3 and 4, extending therethrough. Holes 60 are positioned so that when holes 35 through support member 12 are aligned with holes 60 through insert 31, support member 12 is angled at the desired forty five degrees in a plane extending along axis 62. Thus, support member 12 can alternately be positioned to extend straight back from the vehicle in a plane along axis 38 by aligning holes 35 with holes 36, or at a forty five degree angle in a plane along axis 62 by aligning holes 35 with holes 60. It should be noted that rather than having the two sets of holes 35 and 60 located through insert 31, insert 31 could have a single set of holes with two sets of holes provided through support member 12 to provide the alternate positions for the support members. It should also be noted that FIGS. 2, 3, and 5, for purposes of clarity in illustration, show support member 12 in its straight back position as shown in FIG. 1, rather than in its rotated forty five degree position as used when hanging two chairs. FIG. 4 shows both the alternate forty five degree position and the straight back position for support member 12.

The separation of the chairs or other items suspended from support members 12 and 39 will depend not only on the angles of the support members but also on the length of the support members. Thus, the longer the support members, the less the necessary angle between the support members to provide desired separation of the chairs. In fact, if the support members are long enough, three support members can be provided to support three hanging chairs with the desired separation to avoid undesirable interference between the chairs. Further, the upright member 11 could take various configurations. For Example, rather than the two separate upright tubular members 30 and 40 forming the upright member 11, a single tubular member with a top plate and nipples similar to the tops of inserts 31 and 41 could be welded to and extend from the top plate to form the mountings for the support members.

In the embodiment shown, and as presently preferred for manufacturing efficiencies, the support members are arcuate pieces extending from the upright member to curve upwardly and outwardly. As described above, a prior art support structure for hanging chairs is a C stand wherein a generally C shaped arm extends upwardly from a base for hanging a chair. In many of the C stands, the C shaped arm is made of two pieces joined intermediate the extent of the arm. The configuration of the upper piece of the C shaped arm is as shown for the support members of the illustrated embodiment and the support members may conveniently be the upper piece of the C shaped arm of a C stand.

Whereas the invention is here illustrated and described with reference to an embodiment thereof presently contemplated as the best mode of carrying out the invention in actual practice, it is to be understood that various changes may be made in adapting the invention to different embodiments without departing from the broader inventive concepts disclosed herein and comprehended by the claims that follow.

I claim:

1. Apparatus for attachment to a vehicle trailer hitch receiver to provide an overhead support for suspending hanging furniture, comprising:
    a base configured for attachment to a vehicle mounted trailer hitch receiver;
    an upright member extending upwardly from the base;
    a support member extending outwardly from the upright member a sufficient distance to receive and suspend an item of hanging furniture in normal hanging condition spaced from the upright member; and
    a hanging chair suspended from above by ropes, said ropes secured to a support end of the support member to suspend the hanging chair in normal hanging condition spaced from the upright member.

2. Apparatus for attachment to a vehicle trailer hitch receiver to provide an overhead support for suspending hanging furniture, according to claim 1, wherein the support member is removably attached to the upright member and has an attachment end for removable attachment to the upright member.

3. Apparatus for attachment to a vehicle trailer hitch receiver to provide an overhead support for suspending hanging furniture, according to claim 2, wherein the upright member includes a mounting projection, and wherein the attachment end of the support member forms a sleeve sized to fit removably over the mounting projection of the upright member.

4. Apparatus for attachment to a vehicle trailer hitch receiver to provide an overhead support for suspending hanging furniture, according to claim 3, additionally including securement means for securing the attachment end of the support member to the mounting projection of the upright member in fixed position with respect to the support member.

5. Apparatus for attachment to a vehicle trailer hitch receiver to provide an overhead support for suspending hanging furniture, according to claim 4, wherein the securement means includes a receiving hole through the mounting projection, a receiving hole through the attachment end of the support member to be aligned with the receiving hole through the mounting projection, and a pin that extends through the aligned holes.

6. Apparatus for attachment to a vehicle trailer hitch receiver to provide an overhead support for suspending hanging furniture, according to claim 5, wherein the mounting projection has alternate receiving holes to be selectively aligned with the receiving hole through the support member to position the support member in a selected fixed position with respect to the upright member.

7. Apparatus for attachment to a vehicle trailer hitch receiver to provide an overhead support for suspending hanging furniture, according to claim 1, wherein the support member is rotatably secured to the upright member so its orientation with respect to the upright member can be adjusted.

8. Apparatus for attachment to a vehicle trailer hitch receiver to provide an overhead support for suspending hanging furniture, according to claim 1, additionally including a second support member, wherein there are two support members extending outwardly from the upright member in different directions so that two items of hanging furniture are supported in normal hanging condition spaced from one another and from the upright member.

9. Apparatus for attachment to a vehicle trailer hitch receiver to provide an overhead support for suspending hanging furniture, comprising:
    an elongate base having a longitudinal axis configured for attachment to a vehicle mounted trailer hitch receiver;
    an upright member extending upwardly from the base; and
    two support members, each secured to the upright member and extending outwardly from the upright member in different directions each at an acute angle to the longitudinal axis of the base so that two items of hanging furniture are supported from support ends of the support members in normal hanging condition spaced from one another and from the upright member.

10. Apparatus for attachment to a vehicle trailer hitch receiver to provide an overhead support for suspending hanging furniture, according to claim 9, wherein each support member is removably attached to the upright member and each support member has an attachment end for removable attachment to the upright member.

11. Apparatus for attachment to a vehicle trailer hitch receiver to provide an overhead support for suspending hanging furniture, according to claim 10, wherein the upright member includes two mounting projections and wherein the attachment end of each of the support members form a sleeve sized to fit removably over one of the two mounting projections of the upright member.

12. Apparatus for attachment to a vehicle trailer hitch receiver to provide an overhead support for suspending hanging furniture, according to claim 11, additionally including securement means for securing the attachment ends of each of the support members to a respective mounting projection of the upright member, each in fixed position with respect to the upright member.

13. Apparatus for attachment to a vehicle trailer hitch receiver to provide an overhead support for suspending hanging furniture, according to claim 12, wherein the securement means includes a receiving hole through the mounting projection, a receiving hole through the attachment end of the support member to be aligned with the receiving hole through the mounting projection, and a pin that extends through the aligned holes.

14. Apparatus for attachment to a vehicle trailer hitch receiver to provide an overhead support for suspending hanging furniture, according to claim 13, wherein at least one of the mounting projections has alternate receiving holes to be selectively aligned with the receiving hole through one of the support members to position the one support member in a selected fixed position with respect to the upright member.

15. Apparatus for attachment to a vehicle trailer hitch receiver to provide an overhead support for suspending hanging furniture, according to claim 9, wherein at least one of the support members is rotatably secured to the upright member so its orientation with respect to the upright member can be adjusted.

16. Apparatus for attachment to a vehicle trailer hitch receiver to provide an overhead support for suspending hanging furniture, according to claim 9, wherein each support member is arcuate and secured to the upright member to extend upwardly and outwardly from the upright member.

17. Apparatus for attachment to a vehicle trailer hitch receiver to provide an overhead support for suspending hanging furniture, comprising:
   an elongate base having a longitudinal axis configured for attachment to a vehicle mounted trailer hitch receiver;
   an upright member extending upwardly from the base and including a mounting projection;
   a support member removably and rotatably attached to the upright member and extending outwardly from the upright member a sufficient distance to receive and suspend at a support end thereof an item of hanging furniture in normal hanging condition spaced from the upright member, said support member including an attachment end formed as a sleeve sized to fit over the mounting projection of the upright member for removable and rotatable attachment to the upright member so the orientation of the support member with respect to the upright member can be adjusted;
   securement means for securing the attachment end of the support member to the mounting projection of the upright member in fixed position with respect to the mounting projection, said securement means including alternate receiving holes through the mounting projection, a receiving hole through the attachment end of the support member to be aligned with a selected receiving hole of the alternate receiving holes through the mounting projection to selectively position the support member in a plane extending along the longitudinal axis of the base or a plane extending at an angle to the longitudinal axis of the base, and a pin that extends through the respective aligned holes to secure the support member in the selected position.

18. Apparatus for attachment to a vehicle trailer hitch receiver to provide an overhead support for suspending hanging furniture, according to claim 17, wherein the upright member has a second mounting projection, and additionally including a second support member removably attached to the upright member and extending outwardly from the upright member in a direction therefrom different than the support member a sufficient distance to receive and suspend at a support end thereof an item of hanging furniture in normal hanging condition spaced from the upright member and from a piece of hanging furniture suspended from the support member, said second support member having an attachment end formed as a sleeve sized to fit over the second mounting projection of the upright member for removable attachment thereto, wherein there are two support members extending outwardly from the upright member in different directions so that two items of hanging furniture are supported in normal hanging condition spaced from one another and from the upright member.

19. Apparatus for attachment to a vehicle trailer hitch receiver to provide an overhead support for suspending hanging furniture, according to claim 18, wherein the mounting projection and the second mounting projection are oriented substantially vertically when the apparatus is in use.

20. Apparatus for attachment to a vehicle trailer hitch receiver to provide an overhead support for suspending hanging furniture, according to claim 19, wherein the support member and the second support member are substantially arcuate.

* * * * *